United States Patent [19]
Woods et al.

[11] Patent Number: 5,833,017
[45] Date of Patent: Nov. 10, 1998

[54] CUTTING BIT ASSEMBLY FOR IMPINGING AN EARTH STRATA

[75] Inventors: Gerald L. Woods, Bedford; Percy D. Bollman, Schellsburg; Cary D. Ritchey, Curryville, all of Pa.

[73] Assignee: Kennametal Inc., Latrobe, Pa.

[21] Appl. No.: 720,904

[22] Filed: Oct. 10, 1996

[51] Int. Cl.⁶ .............................. E21B 10/36; E21B 10/62
[52] U.S. Cl. .......................... 175/320; 175/415; 175/417
[58] Field of Search .................................. 175/420.1, 320, 175/432, 415, 417; 299/113, 110, 111, 106, 107

[56] References Cited

U.S. PATENT DOCUMENTS

| | | | |
|---|---|---|---|
| 3,554,306 | 1/1971 | Wilburn | 175/320 |
| 3,837,195 | 9/1974 | Pelto | 70/276 |
| 3,970,407 | 7/1976 | Uffman | 408/239 A |
| 4,125,167 | 11/1978 | Evans et al. | 175/65 |
| 4,190,128 | 2/1980 | Emmerich | 175/420.1 |
| 4,222,204 | 9/1980 | Benner | 51/362 |
| 4,226,285 | 10/1980 | Moseley, Jr. | 166/65 M |
| 4,296,822 | 10/1981 | Ormsby | 175/249 |
| 4,337,980 | 7/1982 | Krekeler | 299/91 |
| 4,368,789 | 1/1983 | Orr et al. | 175/418 |
| 4,658,875 | 4/1987 | Grabovac | 407/49 X |
| 4,667,447 | 5/1987 | Barton | 51/362 |
| 4,807,404 | 2/1989 | Lewis | 51/362 |
| 4,941,245 | 7/1990 | Yamashita et al. | 29/78 |
| 4,995,768 | 2/1991 | Craft | 408/239 A |
| 5,172,775 | 12/1992 | Sheirer et al. | 175/57 |
| 5,184,925 | 2/1993 | Woods et al. | 408/144 |
| 5,271,253 | 12/1993 | Cassada et al. | 70/276 |
| 5,399,051 | 3/1995 | Aken et al. | 408/230 |
| 5,400,861 | 3/1995 | Sheirer | 175/427 |
| 5,470,180 | 11/1995 | Jore | 408/239 R |
| 5,605,382 | 2/1997 | Massa | 299/107 |

FOREIGN PATENT DOCUMENTS 1172155   6/1959   France .

Primary Examiner—Hoang C. Dang
Attorney, Agent, or Firm—John J. Prizzi

[57] ABSTRACT

A cutting bit assembly which includes a driven member and a cutting bit detachably connected to the driven member by a retainer. The retainer includes a magnetic pin that removably engages at least one of the cutting bit and the driven member.

6 Claims, 4 Drawing Sheets

CUTTING BIT ASSEMBLY FOR IMPINGING AN EARTH STRATA

BACKGROUND

For many years various cutting bits (or tools) have been used to impinge the earth strata (e.g., coal formations, rock formations, road surfaces, and the like) so as to perform various mining, boring, and road planing operations. It is typical that these tools wear during operation so that at some point in time the tool reaches the end of its useful life which necessitates replacement thereof in the field.

Tools which impinge the earth strata include rotatable cutting bits (e.g., point attack mine tools, construction tools, and the like) which include a hard insert at the axially forward end. These rotatable cutting bits are rotatably mounted within the bore of a holder (or block) and held therein by a retainer.

In many applications, a plurality of holders (with a cutting bit in each holder) mount to a driven member (e.g., a drum or wheel) which is driven under the influence of a driver (e.g., a motor). One example of such an arrangement is a road planing drum laced with road planing tools. It can be appreciated that, using present techniques, it is time-consuming for the operator to change an entire drum of cutting bits. It thus would be desirable to provide a cutting bit assembly that provides a secure connection between the cutting bit and the holder yet permits the relatively easy connection or removal of the cutting bit to the holder.

Heretofore, some styles of the retainer have been discarded along with the used cutting bit. In order to reduce the overall operating costs of the cutting bit, it would be desirable to provide a cutting bit assembly in which the operator is able to reuse the retainer.

Tools which impinge the earth strata further include a roof bit with a hard insert at the axially forward end (i.e., impingement end) thereof wherein the roof bit non-rotatably connects, either directly or through a chuck or other type of connector, to a driver member. Driving the driver member causes the roof bit to be driven, which typically is in a rotary fashion. In order to secure the driver member to the roof bit, it is important that there be a secure connection between the roof bit and the driver member.

In the past, a steel retainer pin having a shank and a serrated head has been used to secure a roof bit to a chuck (or coupling). The roof bit body contains a hole which registers with a hole in the chuck. The shank of the retainer pin passes through the hole in the roof bit and into the hole in the chuck. The retainer pin is forced into the hole in the roof bit so that the serrated head engages the periphery of the roof bit body that defines the hole so as to secure the roof bit to the chuck. Another retention arrangement (or retainer) which has been used comprises a chuck with a hole that contains a spring-biased pin which engages a corresponding hole in the roof bit body when the roof bit is positioned on the chuck so that the hole in the roof bit comes into registration with the pin so as to secure the roof bit to the chuck.

Although each one of the above retention arrangements has functioned in an adequate fashion, there remain some drawbacks therewith. Both retention arrangements have been difficult to remove. Both retention arrangements have experienced breakage during either mounting of the roof bit on the chuck or the removal of the roof bit from the chuck. In the case of the serrated steel retainer pin, it is necessary to shear the retainer pin to remove the roof bit from the chuck. This destroys the retainer pin and leaves the serrated head in the hole in the roof bit body. This part of the retainer pin must then be removed from the roof bit body when the roof bit body is recycled.

In view of these drawbacks with the past retention arrangements, it would be desirable to provide a cutting bit assembly, especially one for a roof bit assembly, which would permit the easy removal of the roof bit, and would not experience breakage during either the mounting or removal of the roof bit from the chuck.

SUMMARY

In one form thereof, the invention is a cutting bit assembly which comprises a driven member and a cutting bit detachably connected to the driven member by a retainer. The retainer includes a magnetic pin that removably engages at least one of the cutting bit and the driven member.

BRIEF DESCRIPTION OF THE DRAWINGS

The following is a brief description of the drawings which form a part of this patent application.

DETAILED DESCRIPTION

Figure 1:
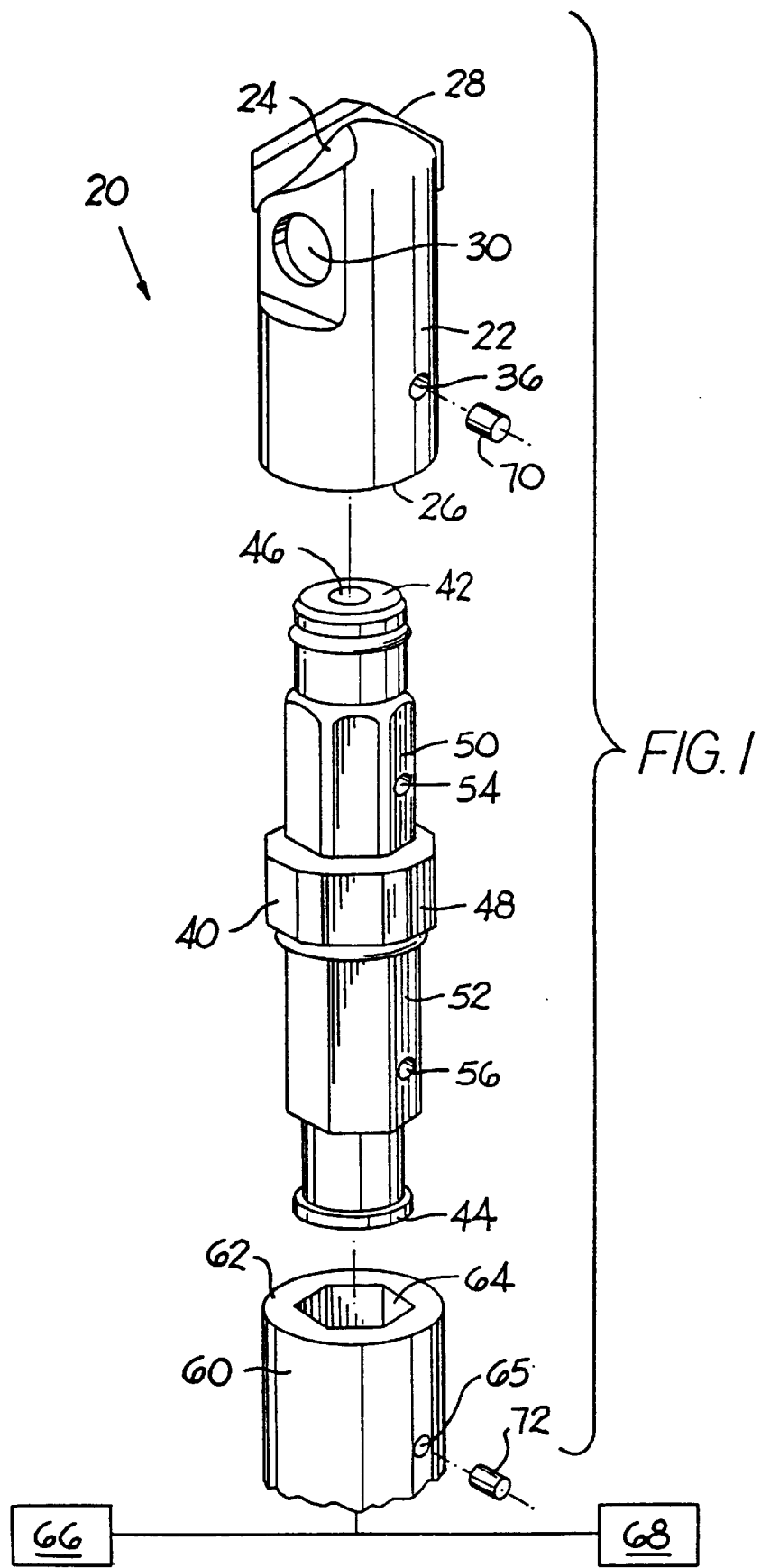
FIG. 1 is an isometric view of a specific embodiment of a roof bit assembly which has been exploded along its longitudinal axis.
Figure 2:
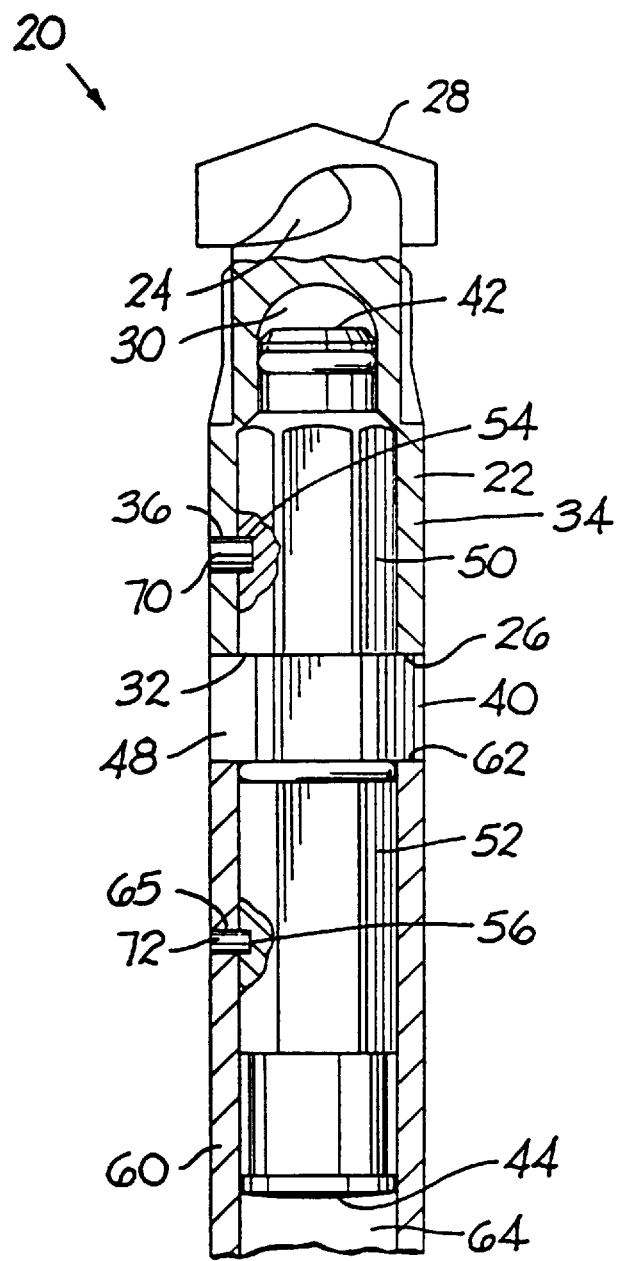
FIG. 2 is a cross-sectional view of the roof bit assembly of FIG. 1 with the components in an assembled condition.

Referring to the drawings, FIGS. 1 and 2 illustrate a specific embodiment of a roof bit assembly generally designated as 20. Roof bit assembly 20 includes a cutting bit (or roof bit) 22 which has an axially forward end 24 and an axially rearward end 26. There is a single cutting insert 28 at the axially forward end 24 of the cutting bit 22. The cutting insert 28 is of the style shown and described in issued U.S. Pat. No. 5,172,775, to Sheirer et al., for a Rotary Drill Bit Assembly (assigned to the assignee of the present patent application), which is hereby incorporated by reference herein. Cutting bit 22 contains a cavity 30 therein which has an opening 32 at the rearward end 26 of the cutting bit 22. Cutting bit 22 further includes a bit wall 34 which contains a passage 36 that passes completely therethrough so as to communicate with the cavity 30.

Roof bit assembly 20 further includes a chuck 40 which has an axially forward end 42 and an axially rearward end 44. A generally cylindrical passage 46 passes through the entire length of the chuck 40. The chuck 40 has an enlarged diameter portion 48 which separates the chuck 40 into an axially forward portion 50 and an axially rearward portion 52. The chuck 40 contains a generally cylindrical blind recess (or hole) 54 in the exterior surface of the axially forward portion 50 thereof. The chuck 40 further contains a generally cylindrical blind recess (or hole) 56 in the exterior surface of the axially rearward portion 52 thereof.

Roof bit assembly 20 also includes a drill rod 60 which has an axially forward end 62 and an axially rearward end (not illustrated). Drill rod 60 presents a bore 64 which has an opening at the axially forward end thereof. The drill rod 60 also contains a hole 65, which as will become apparent registers with blind recess 56 upon assembly, adjacent to the axially forward end 62. The drill rod 60 operatively connects to a driver 66 and a pressurized source of coolant 68. Some aspects of the roof bit assembly (especially the chuck and drill rod) are exemplified and described in issued U.S. Pat. No. 5,400,861, to Sheirer, for a Rotatable Cutting Bit Assembly (assigned to the assignee of the present patent application), which is hereby incorporated by reference herein. While not illustrated herein, the cutting inserts described in U.S. Pat. No. 5,400,861 are suitable for use in conjunction with the present invention.

A magnetic pin 70 passes through passage 36 and into blind recess (or hole) 54 so as to connect the cutting bit 22 to the chuck 40. Another magnetic pin 72 passes through hole 65 in the drill rod 60 and into blind recess 56 so as to connect the chuck 40 to the drill rod 60.

The cutting bit 22, the chuck 40, and the drill rod 60 are each made from a ferromagnetic steel. Exemplary grades (AISI) of steel for these components include 15B35 steel for the cutting bit, 4140 steel for the chuck, and 4130 steel for the drill rod. Thus, there is a magnetic attraction between the magnetic pin 70 and the cutting bit 22 and the chuck 40 when in close physical contact. There is also a magnetic attraction between the magnetic pin 72 and the chuck 40 and the drill rod 60 when in close physical contact. The magnetic strength of the magnetic pin 70, i.e., the magnetic attraction between the magnetic pin 70 and the cutting bit 22 and chuck 40, is sufficiently great so that the magnetic pin 70 remains in place to securely connect the cutting bit 22 to the chuck 40 during the operation of the roof bit. The magnetic strength of the magnetic pin 72, i.e., the magnetic attraction between the magnetic pin 72 and the chuck 40 and the drill rod 60, is sufficiently great so that the magnetic pin 72 remains in place to securely connect the chuck 40 and the drill rod 60 during the operation of the roof bit.

It should be appreciated that while the specific embodiment depicts the use of two magnetic pins (70, 72), applicants do not intend to limit the invention to the use of two magnetic pins. Applicants contemplate that only one magnetic pin may be used wherein that pin secures together either the cutting bit 22 and the chuck 40 or the chuck 40 and the drill rod 60.

When it is time to replace the cutting bit 22, the operator can take a magnet, which has an attractive magnetic strength with respect to the magnetic pin 70 that is greater than the magnetic attraction between the magnetic pin and the cutting bit 22 and chuck 40, and position the magnet near the magnetic pin 70 so as to remove the magnetic pin 70 from the passage 36 and the recess 54. The operator could also use a puller or some type of gripper (or pliers) to grip or pull the magnetic pin out of engagement with the roof bit and the chuck. The magnetic pin could have a head or some other structure which would facilitate the operator to obtain a firm grip on the pin.

Once the pin has been removed from engagement with the cutting bit and the chuck, the cutting bit can be removed from the chuck and a new cutting bit 22 can then be positioned on the chuck 40. The magnetic pin 70 is then passed through the passage 36 and into the recess 54 of the chuck so as to securely connect the new cutting bit 22 to the chuck 40. The magnetic pin 70 may be reused in conjunction with the new cutting bit.

The same type of action can be taken with respect to the removal or insertion of the magnetic pin 72 that disconnects, or secures together, the chuck 40 and the drill rod 60. In other words, magnetic pin 72 can be magnetically or physically removed from engagement with the chuck 40 and the drill rod 60 so as to disconnect the same magnetic pin 72 can be physically inserted through hole 65 into engagement with blind recess 56 in the chuck 40 so as to secure the same together.

There are a number of advantages present through the use of the magnetic pins (70, 72). The magnetic pins are easy to insert and remove which is in contrast to earlier retention arrangements. The magnetic pins do not break during the assembly or disassembly of the cutting bit from the chuck, or the chuck from the drill rod, as has been the case in the past. The magnetic pins are reusable and a portion is not left in the roof bit body (as with the serrated type retainer) making the roof bit bodies easier to recycle.

A roof bit, which was made of 15B35 steel, was secured to a chuck, which was made of 4140 steel, via a magnetic pin (such as is shown in FIGS. 1 and 2, except that there was only one magnetic pin to secure the roof bit to the chuck) for testing. The roof bit had a one inch diameter and except for the passage, was structurally similar to a Kennametal KCV4-1 inch style of roof bit. The magnetic pin was a ¼ inch diameter by ¼ inch long cylinder of a neodymium iron boron magnet sold under the trademark Duracore by Nortronics Company, Inc., of Minneapolis, Minn. The roof bit-chuck connection was tested at a rotational speed of about 1100 revolution per minute (rpm) without the magnetic pin being thrown out under the influence of centrifugal force. The typical rotational speed for the operation of a roof bit is about 600 rpm. Thus, the magnetic pin has sufficient magnetic attraction so as to resist the centrifugal forces acting thereon during rotation. The magnetic strength of the magnetic pin (70, 72) can be selected depending upon the strength required for the specific application. In this regard, a ferric iron magnet may be suitable for many applications.

Figure 3:
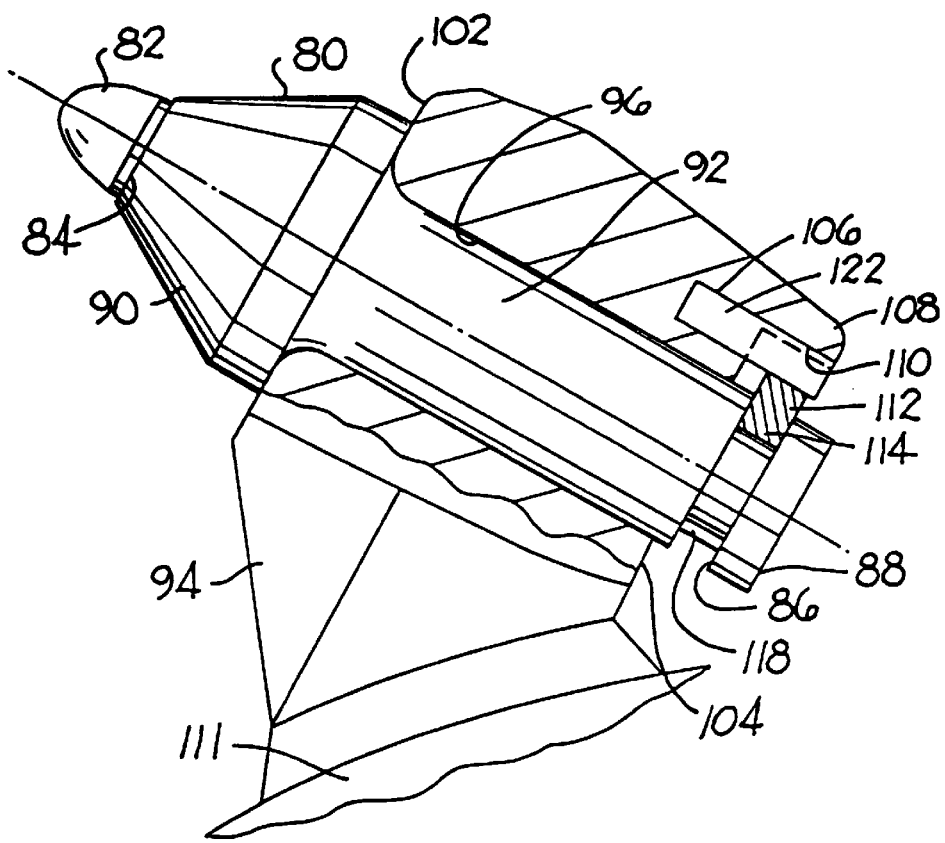
FIG. 3 is a side view of an embodiment of a rotatable cutting bit held in a holder with a portion of the support and the retention clip shown in cross-section.
Figure 4:
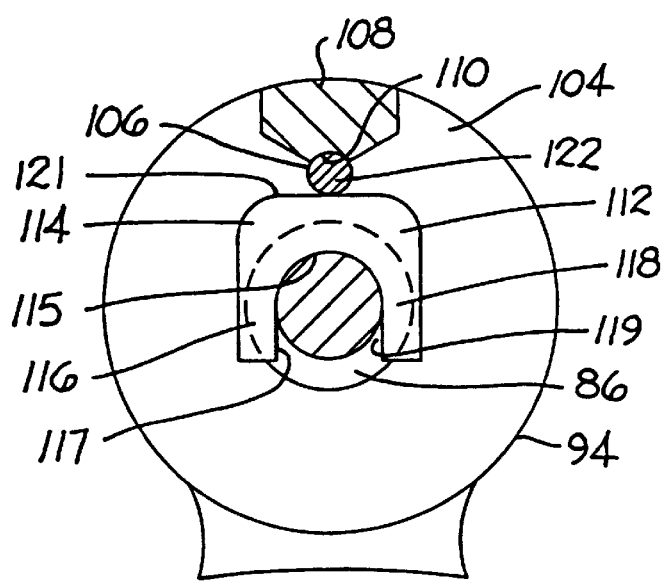
FIG. 4 is a rear end view of the embodiment of FIG. 3 with a portion of the structure shown in cross-section.

Referring to FIGS. 3 and 4, there is shown an embodiment of the invention in which there is a rotatable cutting bit 80 with a hard insert 82 at the axially forward end 84 thereof and an annular groove 86 near the axially rearward end 88 thereof. The cutting bit 80 further includes a head portion 90 and a shank 92.

A holder 94 (or block) contains a bore 96 which has an opening at each of the forward face 102 and the rearward face 104 of the holder 94. Holder 94 contains a cylindrical recess 106 in the rearward face 104 thereof. An integral boss 108 extends out from the holder 94 so as to be proximate to recess 106. Boss 108 includes an arcuate indention 110 in the bottom surface thereof. The holder 94 is mounted (typically as by welding) to a rotatable drum 111 such as, for example, a road planing drum or a coal mining drum.

The holder 94 rotatably retains the cutting bit 80 in the bore 96 thereof by means of a generally U-shaped retention clip 112. Clip 112 has a body portion 114 with a pair of arms 116, 118 that depend therefrom. Retention clip 112 has an interior surface which comprises an arcuate portion 115 and a pair of straight portions 117 and 119 which correspond to arms 116 and 118, respectively. Retention clip 112 has a top surface 121.

When the groove 86 of the cutting bit 80 receives the retention clip 112, the arms (116, 118) extend through the groove 86, and because the spacing between straight portions 117 and 119 of the retention clip 112 is slightly larger than the diameter of the groove 86, the arms 116, 118 do not expand when the retention clip 112 is first received in the groove 86. The curvature of the arcuate portion 115 is about equal to the curvature of the groove 86 so that the arcuate portion 115 of the interior surface of the retention clip 112 is in physical contact with the surface of the groove 86 when the retention clip 112 is received in the groove 86.

Once the retention clip 112 is received within the recess 86 and in the position depicted in FIG. 4, the operator passes a cylindrical magnetic pin 122 into the recess 106 so as to engage the arcuate indention 110 of the boss 108 and physically contact the top surface 121 of the retention clip 112. The boss 108, which is an integral part of the holder 94, is made from the ferromagnetic steel (e.g., AISI 8740 steel) that comprises the holder 94. Thus, there is a magnetic attraction between the magnetic pin 122 and the boss 108 when in close physical contact. The magnetic attraction between the magnetic pin 122 and the boss 108 provides for the secure retention of the magnetic pin 122 during the operation of the cutting bit-holder arrangement. The magnetic pin 122 retains the retention clip 112 in position, the retention clip 112, in turn, rotatably retains the cutting bit 80 within the bore 96 of the holder 94.

It should be appreciated that the magnetic pin 122 does not have to be made from a magnetic material. One exemplary non-magnetic material for the retention pin 122 is plastic.

When there is a need to replace the cutting bit 80, the operator removes the magnetic pin 122 from recess 106 so that the pin 122 is out of engagement with the holder 94 and the retention clip 112. This can be done by physically removing the magnetic pin 122 using pliers or another type of gripper. The operator could also place a magnet near the magnetic pin 122 so as to draw it out of engagement with the holder 94 and the retention clip 112. For the magnet to draw the magnetic pin out of engagement, the magnetic attraction between the magnet and the magnetic pin must be greater than the magnetic attraction that maintains the magnetic pin in position.

Once the magnetic pin 122 is removed from recess 106, i.e., disengaged from the holder and the retention clip, the retention clip 112 may then be removed from the groove 86 and the cutting bit 80 removed from the bore 96 of the holder 94. A new cutting bit 80 may then be positioned within the bore 96 of the holder 94, the retention clip 112 positioned so as to engage the groove 86, and the magnetic pin 122 repositioned in the recess 106 so as to engage the holder 94 and the retention pin 112 thereby providing for the secure rotatable retention of the cutting bit 80 in the holder 94. It should be appreciated that the magnetic pin may be reused in conjunction with the new cutting bit.

Figure 5:
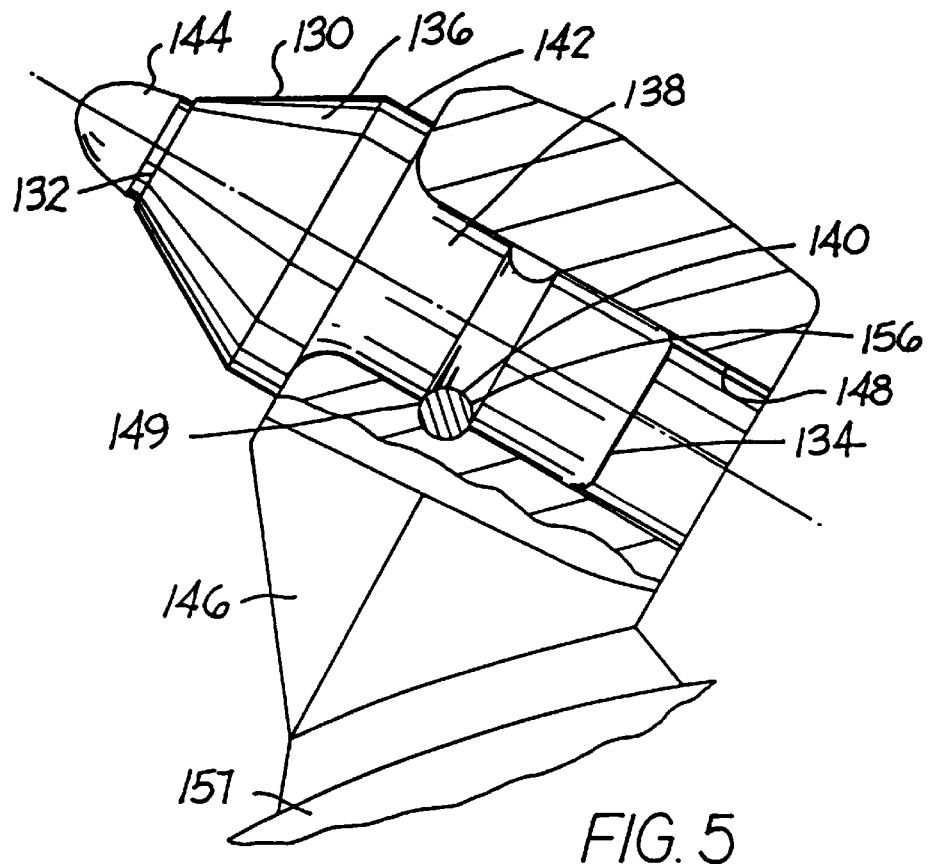
FIG. 5 is a side view of another embodiment of a rotatable cutting bit held in a holder with a portion of the support (or block) and retention pin shown in cross-section.
Figure 6:
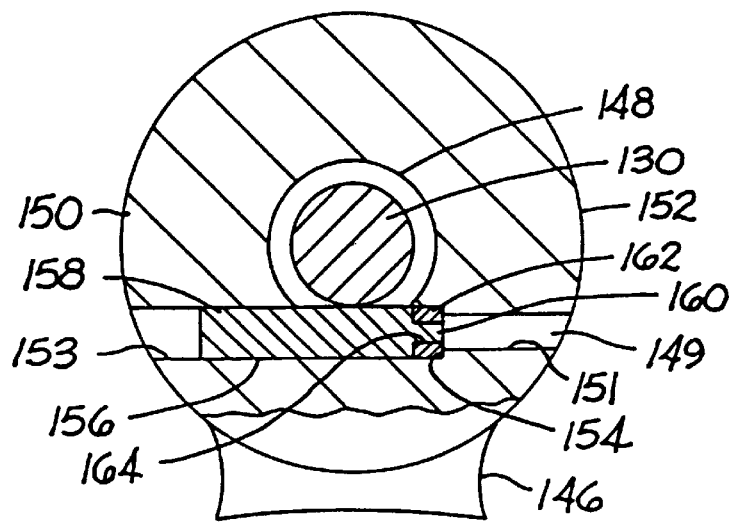
FIG. 6 is a rear view of the embodiment of FIG. 5 wherein a portion of the cutting bit, the block, and the retention pin are shown in cross-section.

Referring to FIGS. 5 and 6, there is shown a rotatable cutting bit 130 which has an axially forward end 132 and an axially rearward end 134. Cutting bit 130 has a head portion 136 and a shank portion 138. The shank portion 138 contains an annular groove 140 between the shoulder 142 and the rearward end 134 of the cutting bit 130. A hard insert 144 is at the axially forward end 132 of the cutting bit 130.

A support (or block) 146 has a longitudinal bore 148 therein, and a transverse bore 149 which passes through a portion of the central bore 148. The transverse bore 149 includes a reduced diameter portion 151 and an enlarged diameter portion 153 with a shoulder 154 at the juncture thereof. As shown in FIG. 5, the longitudinal axis of the bore 148 is generally coaxial with the central longitudinal axis of the cutting bit 130. The central axis of the transverse bore 149 is generally perpendicular to the central longitudinal axis of the longitudinal bore 148. Transverse bore 149 opens to each side surface 150, 152 of the support 146. Support 146 is connected (such as by welding or the like) to a rotatable drum 157.

A cylindrical pin 156 is received within the transverse bore 149. Cylindrical pin 156 has an elongate body 158 and a protrusion 160 which extends from one end of the body 158. The diameter of the protrusion 160 is less than the diameter of the elongate body 158. The cylindrical pin 156 further includes a magnet 162 with a central aperture 164. The protrusion 160 passes through the aperture 164 so that there is a clearance fit therebetween. The magnetic attraction between the body 158 and the magnet 162 retains the magnet 162 on the body 158. However, the magnet 162 could be affixed to the protrusion 160 by epoxy or the like.

The cylindrical pin 156 engages the groove 140 on the shank of the cutting bit and rotatably retains the cutting bit 130 within the bore 148 of the holder 146. The cylindrical pin 156 is positioned in the enlarged diameter portion 153 of the transverse bore 149 in such a fashion that the magnet 162 abuts against the shoulder 154. The support 146 is made of a ferromagnetic steel so that there is a magnetic attraction between the magnet 162 and the support 146. The magnetic attraction between the magnet 162 (of the cylindrical pin 156) and the holder 146 is great enough to retain the cylindrical pin 156 within the transverse bore 149 during operation. The cylindrical pin 156 rotatably retains the cutting bit 130 within the bore 148 of the holder 146 during the operation of the cutting bit-holder assembly.

When it becomes necessary to replace the cutting bit 130, the operator may place a magnet in or near the enlarged diameter portion 153 of the transverse bore 149 and draws the cylindrical pin 156 out of the transverse bore 149. For the magnet to draw the cylindrical pin out of engagement, the magnetic attraction between the magnet and the cylindrical pin must be greater than the magnetic attraction that maintains the cylindrical pin in position. In the alternative, a pin or rod placed in the reduced diameter portion 151 of the transverse bore 149 may be used to push or punch the cylindrical pin 156 out of the transverse bore 149 via the enlarged diameter portion 153.

Once the cylindrical pin 156 has been removed from the transverse bore 149, the cutting bit 130 may then be removed from the longitudinal bore 148 of the holder 146. A new cutting bit 130 may be inserted into the bore 148 of the holder 146 and the cylindrical pin 156 reinserted into the transverse bore 149 so as to engage the groove 140 in the shank 138 of the cutting bit 130. The cutting bit 130 is now rotatably retained within the longitudinal bore 148 of the block 146. The cylindrical pin 156 may be reused in conjunction with the new cutting bit 130.

The patents and other documents identified herein are hereby incorporated by reference herein.

Other embodiments of the invention will be apparent to those skilled in the art from a consideration of the specification or practice of the invention disclosed herein. It is intended that the specification and examples be considered as illustrative only, with the true scope and spirit of the invention being indicated by the following claims.

What is claimed is:

1. A rotatable cutting bit assembly comprising:

a cutting bit having an axially forward end and an axially rearward end, at least one cutting insert at the axially forward end of the cutting bit;

the cutting bit containing a cavity therein, the cavity having an opening at the rearward end of the cutting bit;

the cutting bit having a passage therethrough so as to communicate with the cavity;

a chuck having an axially forward end and an axially rearward end, the chuck containing a recess adjacent to the axially forward end thereof;

upon assembling the cutting bit and the chuck, the axially forward end of the chuck being received in the cavity so that the passage and the recess are in alignment; and a pin being magnetically held in the recess so as to non-rotatably secure the cutting bit to the chuck.

2. The rotatable cutting bit assembly of claim 1 wherein the magnetic attraction between the magnetic pin and the cutting bit and the chuck is sufficiently great so that the magnetic pin maintains its position relative to the chuck and the cutting bit during the operation of the cutting bit assembly.

3. The rotatable cutting bit assembly of claim 1 further including a drill rod which contains a hole therein, and the chuck containing a second recess adjacent to the axially rearward end thereof, upon assembling the drill rod and the chuck, the axially rearward end of the chuck being received in the drill rod so that the hole in the drill rod and the second recess in the chuck are in alignment, and a second magnetic pin being magnetically held in the hole and the second recess so as to non-rotatably secure the drill rod to the chuck.

4. The rotatable cutting bit assembly of claim 3 wherein the magnetic attraction between the second magnetic pin and the drill rod and the chuck is sufficiently great so that the second magnetic pin maintains its position relative to the chuck and the drill rod during the operation of the cutting bit assembly.

5. A cutting bit assembly comprising:

a driven member and a cutting bit detachably connected to the driven member by a retainer;

the retainer including a magnetic pin that removably engages at least one of the cutting bit and the driven member wherein the driven member includes a chuck having a recess, the cutting bit includes a passage therein, and the magnetic pin passing through the passage into engagement with the recess so as to secure the cutting bit to the chuck.

6. The cutting bit assembly of claim 5 further including a drill rod, the drill rod containing a hole therein, the chuck containing another recess, and another magnetic pin passing through the hole in the drill rod and into engagement with the other recess in the chuck so as to secure the chuck to the drill rod.

* * * * *